United States Patent [19]

Nesvadba

[11] Patent Number: 5,328,623
[45] Date of Patent: Jul. 12, 1994

[54] COMPOSITIONS CONTAINING N-HETEROCYCLIC PHOSPHONATES WHICH CONTAIN 6 RING MEMBERS

[75] Inventor: Peter Nesvadba, Marly, Switzerland

[73] Assignee: Ciba-Geigy Corporation, Ardsley, N.Y.

[21] Appl. No.: 928,245

[22] Filed: Aug. 10, 1992

[30] Foreign Application Priority Data

Aug. 16, 1991 [CH] Switzerland ............... 2430/91

[51] Int. Cl.$^5$ .......................................... C10M 137/12
[52] U.S. Cl. ............................. 252/49.9; 252/78.5; 546/21; 524/86; 524/99
[58] Field of Search ............... 546/21; 252/49.9, 78.5; 524/86, 99

[56] References Cited

U.S. PATENT DOCUMENTS

| | | | |
|---|---|---|---|
| 3,155,659 | 11/1964 | Walsh | 546/21 |
| 3,673,196 | 6/1972 | Redmore | 546/21 |
| 3,694,144 | 9/1972 | Redmore | 422/15 |
| 3,759,926 | 9/1973 | Chalmers et al. | 546/21 |
| 3,766,197 | 10/1973 | Redmore | 546/21 |
| 3,770,750 | 11/1973 | Redmore | 546/21 |
| 3,775,057 | 11/1973 | Redmore | 546/21 |
| 3,786,055 | 6/1975 | Redmore | 546/21 |
| 3,809,694 | 5/1974 | Redmore | 546/21 |
| 3,816,428 | 6/1974 | Redmore | 546/21 |
| 3,821,232 | 6/1974 | Redmore | 546/21 |
| 3,830,815 | 8/1974 | Redmore | 546/21 |
| 3,888,627 | 6/1975 | Redmore | 546/21 |
| 3,970,636 | 7/1976 | Hardy et al. | 546/21 |
| 4,250,314 | 2/1981 | Okorodudu | 546/21 |

FOREIGN PATENT DOCUMENTS

| | | | |
|---|---|---|---|
| 4039792 | 6/1992 | Fed. Rep. of Germany . | |
| 221192 | 10/1986 | Japan | 546/21 |
| 1325775 | 8/1973 | United Kingdom | 546/21 |
| 2196631 | 5/1988 | United Kingdom | 546/21 |

OTHER PUBLICATIONS

C.A. 117: 152574n (1992).
Chem. Absts. vol. 106: 102547h, 1987.
Chem. Abst. vol. 106: 98094p, 1987.
Synthesis (1977) pp. 862–864.
Synthesis (1979) pp. 55 & 56.
Tetrahedron Letters, vol. 22, No. 41 pp. 4093–4096, 1981.
C.A. 106, 102548j (1987).

*Primary Examiner*—Ellen M. McAvoy
*Attorney, Agent, or Firm*—Luther A. R. Hall; Michele A. Kovaleski

[57] ABSTRACT

There are disclosed compositions comprising: A) an organic material which is susceptible to thermal, oxidative and/or light-induced degradation, and B) at least one compound of formula I and/or II,

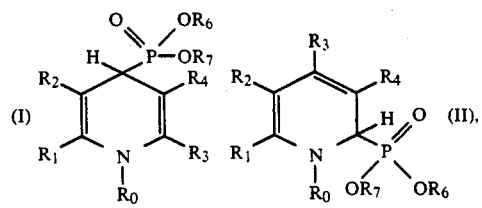

wherein $R_0$ is hydrogen, $C_1$-$C_{12}$alkyl, $C_5$-$C_{12}$cycloalkyl, $C_2$-$C_{12}$alkenyl, phenyl-$C_1$-$C_4$alkyl, —CO—$R_5$ or —CO—$OR_5$, $R_1$ is hydrogen, methyl, ethyl or $R_1$ together with $R_2$ are

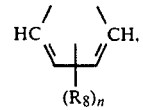

$R_2$ is hydrogen, methyl, ethyl or $R_2$ together with $R_1$ are

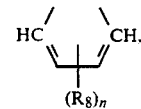

(Abstract continued on next page.)

$R_3$ is hydrogen, methyl, ethyl or $R_3$ together with $R_4$ are

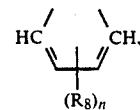

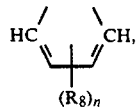

$R_4$ is hydrogen, methyl, ethyl or $R_4$ together with $R_3$ are $R_5$ is $C_1$–$C_{18}$alkyl, $C_5$–$C_{12}$cycloalkyl, phenyl-$C_1$–$C_4$alkyl or phenyl, $R_6$ and $R_7$ are each independently of the other hydrogen, $C_1$–$C_{12}$alkyl, $C_5$–$C_{12}$cycloalkyl, phenyl or phenyl-$C_1$–$C_4$alkyl, $R_8$ is $C_1$–$C_4$alkyl, and n is 0, 1 or 2, with the proviso that, in formula II, $R_3$ is not hydrogen. The compounds of formula I and/or II are particularly effective antioxidants as well as processing stabilisers for synthetic polymers.

13 Claims, No Drawings

COMPOSITIONS CONTAINING N-HETEROCYCLIC PHOSPHONATES WHICH CONTAIN 6 RING MEMBERS

The present invention relates to compositions comprising an organic material which is susceptible to thermal, oxidative and/or light-induced degradation, and at least one dihydro-N-heterocyclic compound which is substituted by phosphonate groups, and to the use of these compounds.

Compounds which contain the structural units

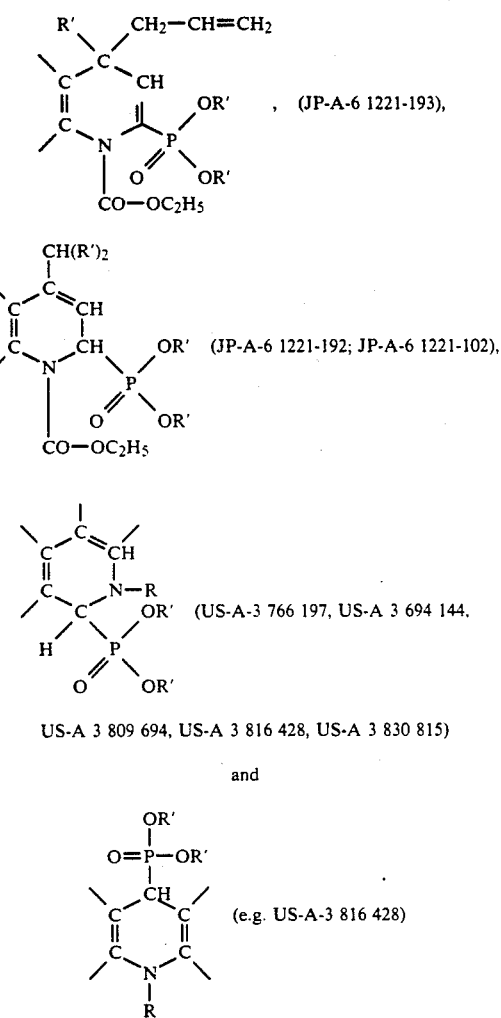

are known biocides and corrosion inhibitors. In the above formulae, R is hydrogen, (cyclo)alkyl, aryl, aralkyl or alkaryl, R' is lower alkyl, and the free valences at the carbon atoms are saturated with hydrogen or organic radicals. In addition, two adjacent carbon atoms with free valences may together be part of an unsubstituted or substituted aromatic 6-membered C-ring.

Surprisingly, it has now been found that compounds carrying such groups may also be used with advantage as stabilisers for protecting organic material, in particular as processing stabilisers for polymers and as antioxidants for functional fluids.

Accordingly, the invention relates to compositions comprising

A) an organic material which is susceptible to thermal, oxidative and/or light-induced degradation, and
B) at least one compound of formula I and/or II,

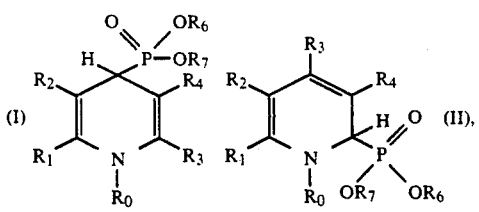

wherein
$R_0$ is hydrogen, $C_1-C_{12}$alkyl, $C_5-C_{12}$cycloalkyl, $C_2-C_{12}$alkenyl, phenyl-$C_1-C_4$alkyl, —CO—$R_5$ or —CO—$OR_5$,
$R_1$ is hydrogen, methyl, ethyl or $R_1$ together with $R_2$ are

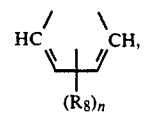

$R_2$ is hydrogen, methyl, ethyl or $R_2$ together with $R_1$ are

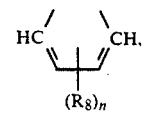

$R_3$ is hydrogen, methyl, ethyl or $R_3$ together with $R_4$ are

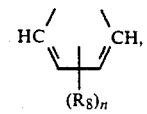

$R_4$ is hydrogen, methyl, ethyl or $R_4$ together with $R_3$ are

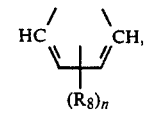

$R_5$ is $C_1-C_{18}$alkyl, $C_5-C_{12}$cycloalkyl, phenyl-$C_1-C_4$alkyl or phenyl,
$R_6$ and $R_7$ are each independently of the other hydrogen, $C_1-C_{12}$alkyl, $C_5-C_{12}$cycloalkyl, phenyl or phenyl-$C_1-C_4$alkyl,
$R_8$ is $C_1-C_4$alkyl, and
n is 0, 1 or 2.

$R_0$ in the compounds of formulae I and II is preferably not hydrogen.

$R_0$, $R_6$ and $R_7$ defined as $C_1-C_{12}$alkyl may be branched or unbranched radicals, typically methyl, ethyl, propyl, isopropyl, n-butyl, isobutyl, tert-butyl, pentyl, isopentyl, hexyl, heptyl, 3-heptyl, octyl, 2-ethylhexyl, nonyl, decyl, undecyl, dodecyl, 2-ethylbutyl, 1-methylpentyl, 1,3-dimethylbutyl, 1,1,3,3-tetramethylbutyl, 1-methylhexyl, isoheptyl, 1-methylheptyl, 1,1,3-trimethylhexyl or 1-methylundecyl. Preferred alkyl radicals are those of 1-4 carbon atoms. Examples of such radicals are listed above. The same also applies to $R_5$ and $R_8$ as $C_1$-$C_4$alkyl. $R_5$ as $C_1$-$C_{18}$alkyl may also additionally be tridecyl, tetradecyl, pentadecyl, hexadecyl, heptadecyl or octadecyl.

$R_8$ is preferably methyl.

$R_0$, $R_5$, $R_6$ and $R_7$ as $C_5$-$C_{12}$cycloalkyl may typically be cyclopentyl, cyclohexyl, cycloheptyl, cyclooctyl or cyclododecyl. Cyclopentyl and cyclohexyl are preferred. Cyclohexyl is particularly preferred.

$R_0$ as $C_2$-$C_{12}$alkenyl may be branched or unbranched and is typically vinyl, allyl, 2-methallyl, hexenyl or undecenyl.

$R_0$ and $R_5$ in formula II are preferably groups which are not sterically hindered, i.e. $R_0$ is preferably hydrogen and linear $C_1$-$C_4$alkyl and $R_5$ is preferably linear $C_1$-$C_4$alkyl.

$R_0$, $R_5$, $R_6$, and $R_7$ as phenyl-$C_1$-$C_4$alkyl may typically be benzyl, phenethyl, 3-phenylpropyl, α-methylbenzyl or α,α-dimethylbenzyl. Benzyl is preferred.

Preferred compositions are those wherein $R_1$ and $R_2$ in formula II are each independently of the other hydrogen, methyl or ethyl, and also those wherein $R_1$ and $R_2$ in formula II are hydrogen and $R_3$ and $R_4$ are each independently of the other hydrogen, methyl or ethyl, or together are

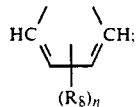

and also those wherein $R_8$ in a group of formula

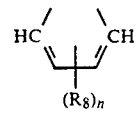

is hydrogen; and those wherein $R_6$ and $R_7$ are $C_1$-$C_6$alkyl, cyclohexyl, phenyl or benzyl; and, preferably, those wherein $R_0$ is $C_1$-$C_4$alkyl, —CO—$R_5$ or —CO—O$R_5$, $R_1$, $R_2$, $R_3$ and $R_4$ are each independently of the other hydrogen, methyl or ethyl, or $R_1$ and $R_2$ and $R_3$ and $R_4$ are each together

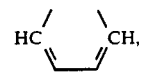

or, in formula II, $R_1$ and $R_2$ are hydrogen, methyl or ethyl and $R_3$ and $R_4$ are hydrogen, methyl or ethyl, or together are

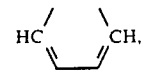

$R_5$ is $C_1$-$C_4$alkyl, and $R_6$ and $R_7$ are each independently of the other $C_1$-$C_4$alkyl; as well as those compositions wherein component B) is at least one compound of formula I.

Compounds of formulae I and/or II are admirably suitable for stabilising organic materials against light-induced, thermal and/or oxidative degradation.

The compounds of formulae I and/or II may be used in particular as stabilisers for natural, semi-synthetic or synthetic polymers, preferably thermoplastic polymers and elastomers, as well as for lubricants and functional fluids, especially machining fluids and hydraulic fluids. Exemplary of suitable materials are:

1. Polymers of monoolefins and diolefins, for example polypropylene, polyisobutylene, polybut-1-ene, polymethylpent-1-ene, polyisoprene or polybutadiene, as well as polymers of cycloolefins, for example of cyclopentene or norbornene, polyethylene (which can be uncrosslinked or crosslinked), for example high density polyethylene (HDPE), low density polyethylene (LDPE and linear low density polyethylene (LLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers linear low density polyethylene (LLDPE) and mixtures thereof with low density polyethylene (LDPE), propylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate or ethylene/acrylic acid copolymers and their salts (ionomers), as well as terpolymers of ethylene with propylene and a diene such as hexadiene, dicyclopentadiene or ethylidenenorbornene; and also mixtures of such copolymers with each other and with polymers mentioned in 1) above, for example polypropylene/ethylene propylene copolymers, LDPE/EVA, LDPE/EAA, LLDPE/EVA and LLDPE/EAA.

3a. Random or alternating copolymers of α-olefins with carbon monoxide.

3b. Hydrocarbon resins (for example $C_5$-$C_9$), including hydrogenated modifications thereof (for example tackifiers).

4. Polystyrene, poly(p-methylstyrene), poly(α-methylstyrene).

5. Copolymers of styrene or α-methylstyrene with dienes or acrylic derivatives, for example styrene/butadiene, styrene/acrylonitrile, styrene/alkylmethacrylate, styrene/butadiene/alkylacrylate, styrene/maleic anhydride, styrene/acrylonitrile/methyl acrylate; mixtures of high impact strength from styrene copolymers and another polymer, for example from a polyacrylate, a diene polymer or an ethylene/propylene/diene terpolymer; and block copolymers of styrene, for example styrene/butadiene/styrene, styrene/isoprene/styrene, styrene/ethylene/butylene/styrene or styrene/ethylene/propylene/styrene.

6. Graft copolymers of styrene or α-methylstyrene, for example styrene on polybutadiene, styrene on polybutadiene/styrene or polybutadiene/acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyalkylacrylates or polyalkylmethacrylates, styrene and acrylonitrile on acrylate/butadiene copolymers, as well as mixtures thereof with the copolymers listed in 5), for example the copolymer mixtures known as ABS, MBS, ASA or AES polymers.

7. Halogenated polymers such as polychloroprene, chlorinated rubbers, chlorinated or sulfochlorinated polyethylene, copolymers of ethylene and chlorinated ethylene, epichlorohydrin homo- and copolymers, preferably polymers of halogenated vinyl compounds, for example polyvinyl chloride, polyvinylidene chloride, polyvinyl fluoride, polyvinylidene fluoride, as well as copolymers thereof, for example vinyl chloride/vinylidene chloride, vinyl chloride/vinyl acetate or vinylidene chloride/vinyl acetate copolymers.

8. Polymers derived from $\alpha,\beta$-unsaturated acids and derivatives thereof, such as polyacrylates and polymethacrylates, polyacrylamides and polyacrylonitriles.

9. Copolymers of the monomers mentioned in 8) with each other or with other unsaturated monomers, for example acrylonitrile/butadiene copolymers, acrylonitrile/alkylacrylate copolymers, acrylonitrile/alkoxyalkylacrylate or acrylonitrile/vinyl halide copolymers or acrylonitrile/alkylmethacrylate/butadiene terpolymers.

10. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinylbutyrate, polyallyl phthalate or polyallylmelamine; as well as their copolymers with the olefins mentioned in 1) above.

11. Homopolymers and copolymers of cyclic ethers such as polyalkylene glycols, polyethylene oxide, polypropylene oxide or copolymers thereof with bisglycidyl ethers.

12. Polyacetals such as polyoxymethylene and those polyoxymethylenes which contain ethylene oxide as a comonomer; polyacetals modified with thermoplastic polyurethanes, acrylates or MBS.

13. Polyphenylene oxides and sulfides and mixtures thereof with polystyrene or polyamides.

14. Polyurethanes which are derived from polyethers, polyesters or hydroxyl-terminated polybutadienes on the one hand and aliphatic or aromatic polyisocyanates on the other, as well as precursors thereof.

15. Polyamides and copolyamides which are derived from diamines and dicarboxylic acids and/or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene, diamine and adipic acid; polyamides prepared from hexamethylenediamine and isophthalic and/or terephthalic acid, with or without an elastomer as modifier, for example poly-2,4,4-trimethylhexamethylene terephthalamide or poly-m-phenylene isophthalamide; block copolymers of the aforementioned polyamides with polyolefins, olefin copolymers, ionomers or chemically bonded or grafted elastomers; or with polyethers, for example with polyethylene glycol, polypropylene glycol or polytetramethylene glycol; and also polyamides or copolyamides modified with EPDM or ABS, and polyamides condensed during processing (RIM polyamide systems).

16. Polyureas, polyimides and polyamide-imides and polybenzimidazoles.

17. Polyesters derived from dicarboxylic acids and diols and/or from hydroxycarboxylic acids or the corresponding lactones, such as poly-ethylene terephthalate, polybutylene terephthalate, poly-1,4-dimethylolcyclohexane terephthalate, polyhydroxybenzoates as well as block-copolyether esters derived from hydroxyl-terminated polyethers; and also polyesters modified with polycarbonates or MBS.

18. Polycarbonates and polyester carbonates.

19. Polysulfones, polyether sulfones and polyether ketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low flammability.

23. Crosslinkable acrylic resins derived from substituted acrylic esters such as epoxy acrylates, urethane acrylates or polyester acrylates.

24. Alkyd resins, polyester resins or acrylate resins which are cross-linked with melamine resins, urea resins, polyisocyanates or epoxy resins.

25. Crosslinked epoxy resins which are derived from polyepoxides, for example from bisglycidyl ethers or from cycloaliphatic diepoxides.

26. Natural polymers such as cellulose, rubber, gelatine and chemically modified homologous derivatives thereof such as cellulose acetates, cellulose propionates and cellulose butyrates, or the cellulose ethers, such as methylcellulose; as well as rosins and their derivatives.

27. Mixtures (polyblends) of the aforementioned polymers, for example PP/EPDM, polyamide/EPDM or ABS, PVC/EVA, PVS/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPE/HIPS, PPE/PA 6.6 and copolymers, PA/HDPE, PA/PP, PA/PPE.

28. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also the mixtures of synthetic esters with mineral oils in any weight ratios which are used as spinning compositions, as well as aqueous emulsions of such materials.

29. Aqueous emulsions of natural or synthetic rubber, for example natural latex or latices of carboxylated styrene/butadiene copolymers.

The compositions of this invention conveniently contain the compounds of formula I and/or II in an amount of 0.01 to 10, typically 0.05 to 5, preferably 0.05 to 3 and, 0.1 to 2%, by weight. The compositions may contain one or more of the compounds of formula I and/or II, and the percentages by weight are based on the total amount of said compounds. The computation is based on the total weight of the organic material without the compounds of formula I and/or II.

Incorporation in the organic materials can be effected by blending them with, or by application thereto, of the compounds of formula I and/or II and further optional additives by methods which are commonly employed in the art. If the organic materials are polymers, especially synthetic polymers, the incorporation can be effected before or during the fabrication of shaped articles or by applying the dissolved or dispersed compounds to the polymer, with or without subsequent evaporation of the solvent. In the case of elastomers, these may also be stabilised as lattices. A further means of incorporating the compounds of formula I and/or II in polymers consists in adding them before, during or directly after the polymerisation of the corresponding monomers or before crosslinking. The compounds of formula I and/or II can also be added in encapsulated form (e.g. in waxes, oils or polymers). If the compounds of formula I and/or II are added before or during polymerisation, they can also act as regulators for the chain length of the polymers (chain terminators).

The compounds of formula I or mixtures thereof can also be added in the form of a masterbatch which contains these compounds to the synthetic resins to be stabilised, typically in a concentration of 2.5 to 25% by weight.

The compounds of formula I can conveniently be incorporated by the following techniques:
as emulsion or dispersion (e.g. to lattices or emulsion polymers)
as dry mixture while blending additional components or polymer mixtures
by direct addition to the processing apparatus (e.g. extruder, internal mixer and the like)
as solution or melt.

Polymer compositions of this invention can be used in different form and processed to different products, for example sheets, filaments, ribbons, moulded articles, profiles or as binders for paints and varnishes, adhesives or putties.

The invention also relates to a process for stabilising organic material, in particular thermoplastic polymers, elastomers or lubricants and functional fluids, preferably lubricants against oxidative, thermal and/or light-induced degradation, which comprises incorporating in or applying to said material a compound of formula I and/or II as stabiliser.

The compounds of formulae I and II are also suitable for imparting enhanced performance properties to lubricants and functional fluids. Particular attention is therefore drawn to their surprisingly good activity as antioxidants. The invention accordingly also relates to compositions comprising a lubricant or a functional fluid and at least one compound of the general formula I and/or II as described above.

Functional fluids are typically hydraulic fluids and machining fluids.

The suitable lubricants and hydraulic fluids are based, for example, on mineral or synthetic oils or mixtures thereof. The lubricants are known to the skilled person and described in the pertinent technical literature, for example in Dieter Klamann, "Schmierstoffe und verwandte Produkte" (Lubricants and Related Products), Verlag Chemie, Weinheim, 1982, in Schewe-Kobek, "Das Schmiermittel-Taschenbuch" (The Lubricant Handbook), Dr. Alfred Hüthig-Verlag, Heidelberg, 1974 and in "Ullmanns Enzyklopädie der technischen Chemie" (Encyclopedia of Industrial Chemistry), Vol. 13, pages 85–94 (Verlag Chemie, Weinheim, 1977).

The lubricants are in particular oils and fats based typically on a mineral oil. Oils are preferred.

The mineral oils are based preferably on hydrocarbon compounds.

Synthetic lubricants typically comprise lubricants based on aliphatic or aromatic carboxylates, polymeric esters, polyalkylene oxides, phosphates, poly-α-olefins or silicones, on a diester of a divalent acid with a monohydric alcohol, for example dioctyl sebacate or dinonyl adipate, on a triester of trimethylolpropane with a monovalent acid or with a mixture of such acids, for example trimethylolpropane tripelargonate, trimethylolpropane tricaprylate or mixtures thereof, on a tetraester of pentaerythritol with a divalent acid or with a mixture of such acids, for example pentaerythritol tetracaprylate, or on a complex ester of monovalent and divalent acids with polyhydric alcohols, for example a complex ester of trimethylolpropane with caprylic and sebacic acid or of a mixture thereof. Especially suitable are, in addition to mineral oils, for example poly-α-olefins, ester-based lubricants, phosphates, glycols, polyglycols and polyalkylene glycols, and mixtures thereof with water.

Suitable vegetable oils are the oils, fats and waxes which may be obtained from olives, palms, palm nuts, beet, rape, linseeds, ground nuts, soybeans, cotton seeds, castor oil plants, sunflower seeds, pumpkin seeds, coconuts, maize or their modified forms such as sulfated or epoxidised oils, for, example epoxidised soybean oil, as well as mixtures of these substances. Illustrative examples of animal oils, fats and waxes which may be used as lubricants are tallows, fish oils, sperm oils, neat's foot oil, lard oils and the modified forms and mixtures thereof.

Machining fluids such as rolling, drawing and cutting oils are usually based on the above described mineral and synthetic oils and can also be in the form of oil-in-water and water-in-oil emulsions. The same applies to hydraulic fluids. Further suitable functional fluids are compressor oils and spinning formulations.

The functional fluid or lubricant may contain the compounds of formula I and/or II described above in amounts of 0.01 to 10% by weight, conveniently 0.03 to 5% by weight, preferably 0.05 to 3% by weight and, most preferably, 0.5 to 1.5% by weight, based on the composition.

The compounds of formula I and/or II may be mixed with the functional fluid in a manner known per se. The compounds are readily soluble in oils. It is also possible to prepare a masterbatch, which can be diluted in accordance with the consumption to suitable concentrations with the appropriate functional fluid. In such cases, concentrations or more than 10% by weight are also possible.

In addition to the novel compounds and mixtures, the compositions of this invention—especially if they contain organic, preferably synthetic, polymers—may also comprise other customary additives. Exemplary of such additives are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-di-octylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butyl-hydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxyphenyl)adipate.

1.4. Hydroxylated thiodiphenylethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.5. Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.6. O-, N- and S-benzyl compounds, for example 3,5,3',5'-tetra(tert-butyl-4,4'-dihydroxydibenzyl)ether, octadecyl-4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.7. Hydroxybenzylated malonates, for example dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis-(3,5-di-tert-butyl-4-hydroxybenzyl)malonate.

1.8. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazines, for example 2,4-bis[(octylmercapto-6-(3,5-di-tert-butyl-4-hydroxyanilino)]-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.10. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of monoethyl 3,5-di-tert-butyl-4-hydroxybenzylphosphonate.

1.11. Acylaminophenols, for example 4-hydroxylauryl anilide, 4-hydroxystearyl anilide, octyl N-(3,5-di-tertbutyl-4-hydroxyphenyl)carbamate.

1.12. Esters of β-(3,5-di-tertbutyl-4-hydroxyphenyl)propionic acid with monohydric or polyhydric alcohols, as with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.13. Esters of β-(5-tert-butyl-4-hydroxy-3-methylphenyl)propionic acid with monohydric or polyhydric alcohols, as with methanol, ethanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(3,5-dicyclohexyl-4-hydroxyphenyl)propionic acid with monohydric or polyhydric alcohols, as with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert-butyl-4-hydroxyphenylacetic acid with monohydric or polyhydric alcohols, as with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

2. UV Absorbers and light stabilisers 2.1. 2-(2'-Hydroxyphenyl)benzotriazoles, for example the 5'-methyl-, 3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octyloxy-, 3',5'-di-tert-amyl- or 3',5'-bis(α,α-dimethylbenzyl)- mixture of 5-chloro-3'-tert-butyl-5'-(2-octyloxycarbonylethyl)-and 5-chloro-3'-tert-butyl-5'-[2-(2-ethylhexyloxy)-carbonylethyl]-, 5-chloro-3'-tert-butyl-5'-(2-methoxycarbonylethyl)-, 3'-tert-butyl-5'-(2-methoxycarbonylethyl)-, 3'-tert-butyl-5'-(2-octyloxycarbonylethyl)-, 3'-tert-butyl-5'-[2-(2-ethylhexyloxy)-carbonylethyl]-, 3'-dodecyl-5'-methyl- and 3'-tert-butyl-5'-(2-isooctyloxycarbonylethyl)-2'-hydroxyphenyl-2H-benzotriazol-2-yl, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_{\overline{2}}$, wherein R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy, 2'-hydroxy-4,4'-dimethoxy derivative.

2.3. Esters of unsubstituted or substituted benzoic acids, for example 4-tertbutylphenyl salicylate, phenyl salicylate, octylphenyl salicylate, dibenzoyl resorcinol, bis(4-tert-butylbenzoyl) resorcinol, benzoyl resorcinol, the 2,4-di-tertbutylphenyl ester of 3,5-di-tert-butyl-4-hydroxybenzoic acid, hexadecyl 3,5-di-tert-butyl-4-hydroxybenzoate, octadecyl 3,5-di-tert-butyl-4-hydroxybenzoate, the 2-methyl-4,6-di-tert-butylphenyl ester of 3,5-di-tert-butyl-4-hydroxybenzoic acid.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], e.g. the 1:1- or 1:2 complex, with or without additional ligands, typically n-butylamine, triethanolamine or N-cyclohexyl-diethanolamine, nickel dibutyl dithiocarbamate, nickel salts of monoalkyl esters, typically methyl or ethyl esters, of 4-hydroxy-3,5-di-tert-butylbenzylphosphonic acid, nickel complexes of 1-phenyl-4-lauroyl-5-hydroxyprazole, with or without additional ligands.

2.6. Sterically hindered amines, for example bis(2,2,6,6-tetramethylpiperidyl) sebacate, bis(2,2,6,6-tetramethylpiperidyl) succinate, bis(1,2,2,6,6-pentamethylpiperidyl) sebacate, the bis(1,2,2,6,6-pentamethylpiperidyl) ester of n-butyl-3,5-di-tert-butyl-4-hydroxybenzylmalonic acid, the condensate of 1-hydroxyethyl-2,2,6,6-tetramethyl-4-hydroxypiperidine and succinic acid, the condensate of N,N'-bis(2,2,6,6-tetramethyl-4-piperidyl)-hexamethylenediamine and 4-tertoctylamino-2,6-dichloro-1,3,5-s-triazine, tris(2,2,6,6-tetramethyl-4-piperidyl)-nitrilotriacetate, tetrakis(2,2,6,6-tetramethyl-4-piperidyl)-1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2(2-hydroxy-3,5-di-tert-butylbenzyl)malonate, 3-n-octyl-7,7,9,9-tetramethyl-1,3,8-triazaspriro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione.

2.7. Oxamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethoxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propoxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxypropoxy)-phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine.

3. Metal deactivators, for example N,N'-diphenyloxamide, N-salicylal-N'-salicyloylhydrazine, N,N'-bis(-salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic acid dihydrazide, oxanilide, isophthalic acid dihydrazide, sebacic acid bis(phenylhydrazide), N,N'-diacetaladipic acid dihydrazide, N,N'-bis(salicyloyl)oxalic acid dihydrazide, N,N'-bis(salicyloyl)thiopropionic acid dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tertbutylphenyl) pentaerythritol diphosphite, bis(2,6-di-tert-butyl-4-methylphenyl)pentaerythritol diphosphite, bis(isodecyloxy)pentaerythritol diphosphite, bis(2,4-di-tert-butyl-6-methylphenyl)pentaerythritol diphosphite, bis(2,4,6-tri-tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyldibenzo[d,g]-1,3,2-dioxaphosphocine.

5. Compounds which decompose peroxide, for example esters, typically the lauryl, stearyl, myristyl or tridecyl esters, of β-thiodipropionic acid, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example, copper salts in conjunction with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium stearate, sodium ricinoleate and potassium palmitate, antimony pyrocatecholate or zinc pyrocatecholate.

8. Nucleating agents, for example, 4-tert-butylbenzoic acid, adipic acid, diphenylacetic acid.

9. Fillers and reinforcing agents, for example calcium carbonate, silicates, glass fibres, asbestos, talc, kaolin, mica, barium sulfate, metal oxides and hydroxydes, carbon black, graphite.

10. Other additives, for example, plasticisers, lubricants, emulsifiers, pigments, fluorescent whitening agents, flameproofing agents, antistatic agents and blowing agents.

Inventive compositions which are based on lubricants, hydraulic fluids and machine fluids may also contain other additives which are incorporated to enhance certain performance properties, including further antioxidants, metal deactivators, rust inhibitors, viscosity index improvers, pour-point depressants, dispersants/surfactants and antiwear additives. In addition to the phenolic antioxidants cited in item 1 of the above list of co-stabilisers, examples of such further additives are:

Examples of amine antioxidants:

N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(naphthyl-2)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, mixture of mono- and dialkylated tert-butyl/tert-octyldiphenylamines, 2,3-dihydro-3,3-dimethyl-4H-1,4-benzothiazine, phenothiazine, N-allylphenothiazine.

Examples of further antioxidants:

Aliphatic or aromatic phosphites, esters of thiodipropionic acid or of thiodiacetic acid, or salts of dithiocarbamic or dithiophosphoric acid.

Examples of metal deactivators, for example for copper, are:

triazoles, benzotriazoles and derivatives thereof, tolutriazoles and derivatives thereof, 2-mercaptobenzothiazole, 2-mercaptobenzotriazole, 2,5-dimercaptobenzotriazole, 2,5-dimercaptobenzothiadiazole, 5,5'-methylenebisbenzotriazole, 4,5,6,7-tetrahydrobenzotriazole, salicylidene propylenediamine, salicylaminoguanidine and the salts thereof.

Examples of rust inhibitors are:

a) organic acids and the esters, metal salts and anhydrides thereof, for example:

N-oleoyl sarcosine, sorbitan monooleate, lead naphthenate, alkenylsuccinic anhydride, for example dodecenylsuccinic anhydride, alkenylsuccinic partial esters and partial amides, 4-nonylphenoxyacetic acid.

b) Nitrogen-containing compounds, for example:

I. Primary, secondary or tertiary aliphatic or cycloaliphatic amines and amine salts of organic and inorganic acids, for example oil-soluble alkylammonium carboxylates.

II. Heterocyclic compounds, for example: substituted imidazolines and oxazolines.

c) Phosphorus-containing compounds, for example:

amine salts of phosphoric acid partial esters or phosphonic acid partial esters, zinc dialkyldithiophosphates.

d) Sulfur-containing compounds, for example:

barium dinonylnaphthalene sulfonates, calcium petroleum sulfonates.

Examples of viscosity index improvers are:

polyacrylates, polymethacrylates, vinyl pyrrolidone/methacrylate copolymers, polyvinylpyrrolidones, polybutenes, olefin copolymers, styrene/acrylate copolymers, polyethers.

Examples of pour-point depressants are:

polymethacrylates, alkylated naphthalene derivatives.

Examples of dispersants/surfactants are:

polybutenylsuccinamides or -imides, polybutenylphosphonic acid derivatives, basic magnesium, calcium, and barium sulfonates and phenolates.

Examples of antiwear additives are:

sulfur and/or phosphorus and/or halogen-containing compounds such as sulfonated vegetable oils, zinc dialkyl dithiophosphates, tritolylphosphate, chlorinated paraffins, alkyl and aryldi- and trisulfides, triphenylphosphorothionates, diethanolaminomethyltolyltriazole, bis(2-ethylhexyl)aminomethyltolyltriazole.

The invention also relates to the use of compounds of formula I and/or II for stabilising organic material which is suceptible to oxidative, thermal and/or actinic degradation, especially natural, semi-synthetic and synthetic polymers or lubricants or functional fluids, first and foremost thermoplastic polymers or elastomers and lubricants. The compounds are especially effective antioxidants.

Preferred compounds of formula I and/or II result in preferred compositions, wherein the organic material is a synthetic polymer, more particularly a thermoplastic polymer or an elastomer, or a lubricant composition or a hydraulic fluid.

The preparation of the compounds of formulae I and II is known per se.(e.g. from U.S. Pat. No. 3,816,428) and comprises reacting the N-"quaternated" [e.g. N-protonated (Example 1), N-acylated (Example 8) or N-alkoxycarbonylated (Example 9)] heterocyclic compound with trialkyl or dialkyl phosphites. The reaction proceeds as a Michaelis-Arbutov reaction, the "quaternated"=N⊕<-salt having an alkylating action. The prerequisite is the presence of unsubstituted ortho- and- /or para-positions relative to the nitrogen atom in formula III below. If ortho- and para-position are available, the para-phosphonate is preferably formed. Blocking substituents at the nitrogen may totally prevent the ortho-substitution. The reaction can be carried out catalytically, conveniently in the presence of sodium iodide. The reaction usually proceeds in accordance with the following scheme:

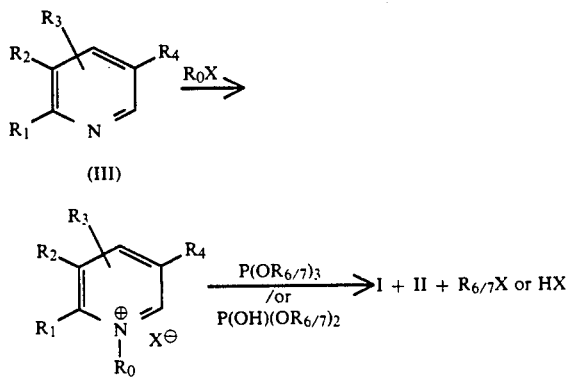

wherein $X^\ominus$ is the anion of a strong mineral or organic acid, conveniently $Cl^\ominus$ or trifluoromethylsulfonate.

The invention is illustrated in more detail by the following Examples in which parts and percentages, unless otherwise indicated, are by weight, and also in the remainder of the specification.

EXAMPLE 1

Table 1, compound 1

A 1 liter flask is charged with 250 ml of acetonitrile and 39.55 g of pyridine. After cooling in bath to $-20°$ C., 52.76 g of ethyl chloroformate are added dropwise, with stirring, such that the temperature does not rise above 0° C. The semi-crystalline mixture is afterwards again cooled to $-10°$ C. and 109.6 g of triisopropyl phosphite is added dropwise such that the temperature remains below 0° C. The cooling bath is removed and the mixture is stirred for 3 hours at room temperature. The acetonitrile is removed on a rotary evaporator and the residue is dissolved in 300 ml of methylene chloride. The solution is washed with 200 ml of 1% hydrochloric acid and 100 ml of water and the organic phase is dried over magnesium sulfate. The methylene chloride is stripped off by vacuum distillation to give 136.8 g of compound 1 with a boiling point of $160°-164°$ C./0.4 mbar.

EXAMPLES 2-7

Table 1, compounds 2-7

Compounds 2-7 are prepared in accordance with the general procedure described in Example 1. The substitution of compound 7 is effected in accordance with the standard procedure for isoquinolines.

EXAMPLE 8

Table 1, compound 8

17.0 g of methylacridinium trifluoromethylsulfonate, prepared from N-methylacridine and trifluoromethanesulfonic acid, and 7.5 g of sodium iodide are suspended in 100 ml of acetonitrile. Then 6.08 ml of trimethylphosphite are added at 0° C. and the clear solution is stirred for 1 hour at room temperature. The solvent is then stripped off and the residue is taken up in 100 ml of methylene chloride. The solution is washed with water, the organic phase is dried and the methylene chloride is stripped off. The residue is taken up in methylene chloride/ethyl acetate (1:1) and chromatographed over a short silica gel column. Recrystallisation from ethyl acetate/ether (1:1) gives 12 g of compound 8 with a melting point of $105°-107°$ C.

EXAMPLE 9

Table 1, compound 9

26.6 g of quinoline are dissolved in 110 ml of acetonitrile. The solution is cooled to $-20°$ C. and then 15.7 g of acetyl chloride are added dropwise. The reaction mixture is stirred for 90 minutes at $-20°$ C., then 43.8 g of triisopropyl phosphite are added dropwise such that the temperature remains below 3° C. The reaction mixture is stirred for 3 hours at room temperature, then the solvent is stripped off and the residue is dissolved in 100 ml of toluene. The solution is washed in succession with 0.5 N HCl, 0.5 N NaOH and water and dried over MgSO₄, giving 63.1 g of compound 9 in the form of a reddish resinous oil. Mass Spectrum: $M^+ = 337.1$.

TABLE 1

| No. | | b.p. °C./mbar | Elemental analysis | | | Yield [%] |
|---|---|---|---|---|---|---|
| | | | % C [calcd/found] | % H [calcd/found] | % N [calcd/found] | |
| 1 | H₅C₂—O—CO—N⟨...⟩P(=O)(O-i-C₃H₇)₂ | 160-4/ 0.4 | 52.99 52.75 | 7.62 7.66 | 4.41 4.39 | 86 |
| 2 | H₉C₄—O—CO—N⟨...⟩P(=O)(O-i-C₃H₇)₂ | 130-3/ 0.004 | 55.64 55.40 | 8.17 8.17 | 4.06 3.92 | 69 |

TABLE 1-continued

| No. | Structure | b.p. °C./mbar | Elemental analysis % C [calcd/found] | % H [calcd/found] | % N [calcd/found] | Yield [%] |
|---|---|---|---|---|---|---|
| 3 | H₉C₄—O—CO—N(pyridine ring with H, P(=O)(O-C₂H₅)₂) | 135–8/ 0.004 | 52.99 / 52.72 | 7.62 / 7.57 | 4.41 / 4.43 | 98 |
| 4 | H₉C₄—O—CO—N(pyridine ring with C₂H₅, H, CH₃, P(=O)(O-i-C₃H₇)₂) | 131–6/ 0.008 | 56.97 / 57.07 | 8.16 / 8.28 | 3.91 / 4.09 | 48 |
| 5 | H₅C₂—O—CO—N(pyridine ring with CH₃, H, P(=O)(O-i-C₃H₇)₂) | 126–30/ 0.03 | 54.37 / 53.88 | 7.91 / 8.08 | 4.23 / 4.23 | 46 |
| 6 | H₅C₂—O—CO—N(fused ring with H, P(=O)(O-i-C₃H₇)₂) | 163–7/ 0.02 | 58.85 / 58.86 | 7.13 / 7.15 | 3.81 / 3.73 | 74 |
| 7 | (benzo-fused N-CO—OC₂H₅, H, P(=O)(O-i-C₃H₇)₂) | 147–9/ 0.006 | 58.85 / 58.61 | 7.13 / 7.07 | 3.81 / 3.62 | 91 |
| 8 | H₃C—N(fused aromatic ring with H, P(=O)(OCH₃)₂) | m.p. °C. 105–7 | 63.36 / 63.37 | 5.98 / 5.95 | 4.62 / 4.54 | 80 |
| 9 | H₃C—CO—N(aromatic ring with H, P(=O)(O-i-C₃H₇)₂) | red oil | mass spectrum: for C₁₇H₂₄NO₄P: 337.4 found: M⁺ = 337 | | | 93 |

EXAMPLE 10

Test for stabilising a lubricant oil against oxidative degradation

The test compound listed in Table 2 is blended with a sample of a hydrogenated mineral oil which is free of sulfur and aromatic compounds and which contains 0.05% of a corrosion inhibitor (Reocor 12 ®, Ciba-Geigy) and 0.04% of a metal deactivator (Reomet 39 ®, Ciba-Geigy). The specimen oil is then subjected to the IP 48/80 oxidation test (British Standard BS 4704:9171). The increase in viscosity according to ASTM D 445 and the acid value according to ASTM D 664 are determined. The lower the values the better the stabilising action of the additive. The results are reported in Table 2.

TABELLE 2

| Compound | Concentration (%) | Increase in viscosity (%) | Acid number (mgKOH/g) |
|---|---|---|---|
| 1 | 0.5 | 192 | 6.9 |
| 3 | 0.5 | 403 | 12.5 |
| 4 | 0.5 | 324 | 11.1 |
| 5 | 0.5 | 395 | 10.9 |
| 6 | 0.5 | 259 | 9.4 |
| 7 | 0.5 | 248 | 9.5 |
| 9 | 0.5 | 344 | 12.5 |
| 1 +A* | 0.4 0.1 | 172 | 7.6 |
| 6 +A* | 0.4 0.1 | 210 | 9.2 |
| — | — | >2000 | >20 |

*A denotes pentaerythritol tetra[β-(3.5-di-tert-butyl-4-hydroxyphenyl)propionate (Irganox ® 1010)

EXAMPLE 11

Stabilisation of the melt index of multiple-extruded polypropylene 1.3 kg of polypropylene powder (melt index 3.2 g/10 min, measured at 230° C./2.16 kg) are blended with 0.05% of Irganox ®1010 (pentaerythritol tetrakis[3-(3,5-di-tert-butyl-4-hydroxyphenyl)propionate), 0.05% of calcium stearate, 0.03% of dihydrotalcite and 0.01% of processing stabiliser. This blend is then extruded in an extruder having a cylinder diameter of 20 mm and a length of 400 mm at 100 rpm, the 3 heating zones being adjusted to the following temperatures: 260, 270, 280° C. The extrudate is cooled by drawing it through a water bath and is then granulated. This granulate is repeatedly extruded. After 3 and after 5 extrusions, the melt index is measured (at 230° C./2.16 kg). A substantial increase in the melt index denotes pronounced chain degradation, i.e. poor stabilisation. The results are shown in Table 3.

TABLE 3

| Compound of Example | Melt index |
|---|---|
| 1 | 8.5 |
| 8 | 10.5 |
| without additive | 15.6 |

What is claimed is:

1. A composition comprising
A) a natral, semi-synthetic or synthetic polymer which is susceptible to thermal, oxidative and/or light-induced degradation, and
B) at least one compound of formula I and/or II,

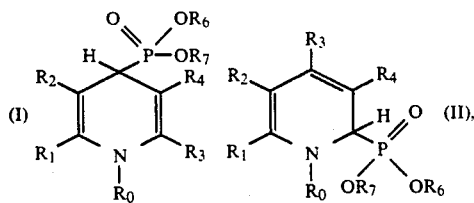

wherein
$R_0$ is hydrogen, $C_1$-$C_{12}$alkyl, $C_5$-$C_{12}$cycloalkyl, $C_2$-$C_{12}$alkenyl, phenyl-$C_1$-$C_4$alkyl, —CO—$R_5$ or —CO—$OR_5$,
$R_1$ is hydrogen, methyl, ethyl or $R_1$ together with $R_2$ are

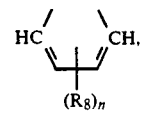

$R_2$ is hydrogen, methyl, ethyl or $R_2$ together with $R_1$ are

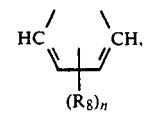

$R_3$ is hydrogen, methyl, ethyl or $R_3$ together with $R_4$ are

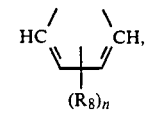

$R_4$ is hydrogen, methyl, ethyl or $R_4$ together with $R_3$ are

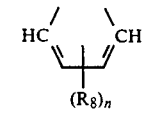

$R_5$ is $C_1$-$C_{18}$alkyl, $C_5$-$C_{12}$cycloalkyl, phenyl-$C_1$-$C_4$alkyl or phenyl,
$R_6$ and $R_7$ are each independently of the other hydrogen, $C_1$-$C_{12}$alkyl, $C_5$-$C_{12}$cycloalkyl, phenyl or phenyl-$C_1$-$C_4$alkyl,
$R_8$ is $C_1$-$C_4$alkyl, and
n is 0, 1 or 2, with the proviso that, in formula II, $R_3$ is not hydrogen.

2. A composition according to claim 1, wherein wherein $R_1$ and $R_2$ in formula II are each independently of the other hydrogen, methyl or ethyl.

3. A composition according to claim 1, wherein $R_1$ and $R_2$ in formula II are hydrogen and $R_3$ and $R_4$ are each independently of the other hydrogen, methyl or ethyl, or together are 4. A composition according to claim 1, wherein n is 0 in a group of formula

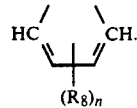

5. A composition according to claim 1, wherein $R_6$ and $R_7$ are $C_1$-$C_6$alkyl, cyclohexyl, phenyl or benzyl.

6. A composition according to claim 1, wherein $R_0$ is $C_1$-$C_4$alkyl, —CO—$R_5$ or —CO—O$R_5$, $R_1$, $R_2$, $R_3$ and $R_4$ are each independently of the other hydrogen, methyl or ethyl, or $R_1$ and $R_2$ and $R_3$ and $R_4$ are each together

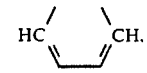

or, in formula II, $R_1$ and $R_2$ are hydrogen, methyl or ethyl and $R_3$ and $R_4$ are hydrogen, methyl or ethyl, or together are

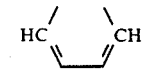

$R_5$ is $C_1$-$C_4$alkyl, and $R_6$ and $R_7$ are each independently of the other $C_1$-$C_4$alkyl.

7. A composition according to claim 1, wherein component B) is at least one compound of formula I.

8. A composition according to claim 1, wherein the synthetic polymer is a thermoplastic polymer or an elastomer.

9. A composition according to claim 8, wherein the thermoplastic polymer is a polyolefin.

10. A process for stabilizing organic material against oxidative, thermal and/or actinic degradation, which comprises incorporating in or applying to said material at least one compound of formula I or formula II or mixtures thereof,

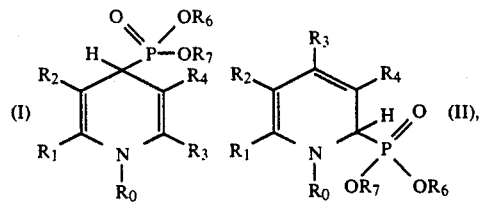

wherein,
$R_0$ is hydrogen, $C_1$-$C_{12}$alkyl, $C_5$-$C_{12}$cycloalkyl, $C_2$-$C_{12}$alkenyl, phenyl-$C_1$-$C_4$alkyl, —CO—$R_5$ or —CO—O$R_5$,
$R_1$ is hydrogen, methyl, ethyl or $R_1$ together with $R_2$ are

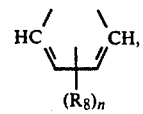

$R_2$ is hydrogen, methyl, ethyl or $R_2$ together with $R_1$ are

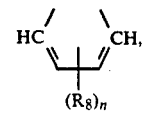

$R_3$ is hydrogen, methyl, ethyl or $R_3$ together with $R_4$ are

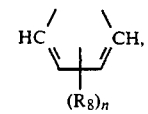

$R_4$ is hydrogen, methyl, ethyl or $R_4$ together with $R_3$ are

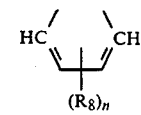

$R_5$ is $C_1$-$C_{18}$alkyl, $C_5$-$C_{12}$cycloalkyl, phenyl-$C_1$-$C_4$alkyl or phenyl,
$R_6$ and $R_7$ are each independently of the other hydrogen, $C_1$-$C_{12}$alkyl, $C_5$-$C_{12}$cycloalkyl, phenyl or phenyl-$C_1$-$C_4$alkyl,
$R_8$ is $C_1$-$C_4$alkyl, and
n is 0, 1 or 2, with the proviso that, in formula II, $R_3$ is not hydrogen.

11. A process according to claim 10 for stabilizing organic material, wherein the organic material is a thermoplastic polymer, elastomer or functional fluid.

12. A process according to claim 11 for stabilizing a functional fluid, wherein the functional fluid is a lubricant, machining fluid or hydraulic fluid.

13. A process according to claim 10 for stabilizing organic material, wherein the organic material is a thermoplastic polymer or elastomer.

* * * * *